United States Patent [19]

Moncur

[11] 4,350,794

[45] Sep. 21, 1982

[54] HIGH-IMPACT POLYAMIDE MOLDING AND EXTRUSION RESIN COMPOSITIONS

[75] Inventor: Marlowe V. Moncur, Pensacola, Fla.

[73] Assignee: Monsanto Company, St. Louis, Mo.

[21] Appl. No.: 160,402

[22] Filed: Jun. 18, 1980

Related U.S. Application Data

[63] Continuation-in-part of Ser. No. 59,856, Jul. 23, 1979, abandoned.

[51] Int. Cl.$^3$ ............................................. C08L 77/00
[52] U.S. Cl. ..................................... 525/183; 525/178; 525/184
[58] Field of Search ................ 525/183, 178, 185, 184

[56] References Cited

U.S. PATENT DOCUMENTS

| | | | |
|---|---|---|---|
| 2,959,565 | 11/1960 | Stanton | 260/45.5 |
| 3,668,274 | 6/1972 | Owens | 260/857 |
| 3,681,312 | 8/1972 | Diamond | 525/183 |
| 3,681,314 | 8/1972 | Diamond | 525/183 |
| 3,725,509 | 4/1973 | Kraft | 525/178 |
| 3,792,113 | 2/1974 | Goswami | 525/178 |
| 3,819,770 | 6/1974 | Kraft | 525/178 |
| 3,884,851 | 5/1975 | Kemp | 260/3.3 |
| 4,207,404 | 6/1980 | Coran | 525/184 |

FOREIGN PATENT DOCUMENTS 1427026  3/1976  United Kingdom .

*Primary Examiner*—Paul Lieberman
*Attorney, Agent, or Firm*—P. D. Matukaitis; E. P. Grattan; S. M. Tarter

[57] ABSTRACT

Polyamide molding and extrusion compositions prepared by melt-blending a polyamide resin and a polyamide reactive halogen functional elastomer. The invention includes a process for preparing the resin and the molded or extruded product.

21 Claims, No Drawings

HIGH-IMPACT POLYAMIDE MOLDING AND EXTRUSION RESIN COMPOSITIONS

CROSS REFERENCE TO RELATED APPLICATIONS

This is a continuation-in-part of copending application Ser. No. 59,856 filed July 23, 1979 abandoned.

BACKGROUND OF THE INVENTION

1. Field of the Invention

The invention is a polyamide-based molding or extrusion composition with high impact resistance, the process for its preparation, and the molded or extruded product.

2. Description of the Prior Art

Polyamide resins have long been known for their excellent toughness, flexibility, abrasion resistance and relatively high impact strength. Molded or extruded polyamides have found application in appliances, consumer products, electronics, machine components, automotive parts, gears, and like uses.

While the impact strength of polyamide resins is relatively high among molding resins, it is insufficient for use where extremely high impact strength, or low notch sensitivity is required, as in collision-vulnerable automotive body parts. Compared to steel, for example, even polyamide molding resins, modified as so far known in the prior art, fall far short of the necessary impact resistance to provide a meaningful entry into markets requiring such high impact strength.

Past efforts to modify properties of polyamide resins have included the forming of blends with other resinous materials which in themselves have certain desirable properties not inherent in the polyamides, and without sacrificing to any great extent the inherent physical properties of the polyamide. For example, among the attempts to improve impact stength were the blending of polyamides with graft or random copolymers of mono-olefins and unsaturated carboxylic acids or acid esters, as disclosed in U.S. Pat. No. 3,236,914 and 3,472,916; and by forming blends of a polyamide, a polyolefin and an olefin/carboxylic acid copolymer as disclosed in U.S. Pat. No. 3,373,223. Some improvement in impact strength was obtained as described in U.S. Pat. No. 3,984,497 through the use of an alkyl acrylate elastomer with a polyamide. Some tear resistance has been added to polyamides, as taught in U.S. 3,546,319, by the use of up to 15% of an elastomer. None of these modifications of polyamides, either alone or in combination, have provided the high degree of impact resistance necessary to withstand impacts typical of minor automotive accidents.

Greater impact resistance has been obtained by using elastomers functionalized with, for example, carboxylic acids to modify polyamides as described by B. N. Epstein in U.S. Pat. No. 4,174,358.

To obtain such impact resistance in a polyamide molding or extrusion resin by less complicated and expensive procedures, and without a substantial sacrifice of other desirable properties of the resin could constitute a significant advance in the art and is an object of this invention.

SUMMARY OF THE INVENTION

The invention is a polyamide composition useful for molding or extruding into high impact resistant forms. This composition is the product of melt blending 50-97% by weight of a polyamide resin and 3-50% by weight of a polyamide reactive halogen-functional elastomer. The present invention includes the composition suitable for such melt blending and the process of melt blending and products molded or extruded therefrom.

The high impact polyamide composition is prepared by melt-blending 50-97% by weight of a polyamide resin and 3-50% by weight of a polyamide reactive halogen-functional elastomer. The blend is subjected to heat and shear during melt blending in order to disperse the elastomer and cause a coupling reaction between the polyamide resin and the elastomer.

The polyamide resin of this invention is useful in obtaining surprisingly high impact resistance.

DESCRIPTION OF THE PREFERRED EMBODIMENTS

As used herein the term "polyamide resin" means a polymer having recurring carbonamide groups in the main chain, and having molecular weight greater than 2000. "Molecular weight", as used herein, refers to number average molecular weight for polyamides (See Flory "Principals of Polymer Chemistry", Page 273, published 1953, by Cornell University Press).

The polyamide resin is ordinarily produced by condensation of equimolar amounts of a dicarboxylic acid or acid derivative containing from two to twenty carbon atoms with a diamine, containing from two to fifteen carbon atoms, or by lactam polymerization according to well known techniques. Preferred polyamides are those based on lactams and those based on aliphatic diamines condensed with aliphatic or aromatic diacids. Included in this group are polyhexamethylene adipamide (nylon 6,6), polycaprolactam (nylon 6), polyhexamethylene azealamide (nylon 6,9) polyhexamethylene sebacamide (nylon 6,10), polyhexamethylene isophthalamide (nylon 6IA), polyhexamethylene tere-co-isophthalamide (nylon 6TA/IA), and mixtures or copolymers thereof.

The product of the present invention is obtained by melt blending a polyamide resin and an elastomer which contains polyamide reactive halogen atoms. The polyamide reactive halogen atoms are those attached to carbon atoms which are activated towards displacement of the halogen atom by the amino end groups of the polyamide during the melt blending process. The activation is the result of the presence in the elastomer of certain other substituent groups.

More specifically, the term "polyamide reactive halogen atoms" herein refers to halogens present in the elastomer in

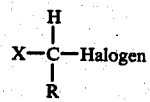

groups. In this formula X is the activating substituent group which is selected from phenyl, vinyl, oxygen (ester or ether), carbonyl, sulfur (thioether or sulfone), cyano, nitro and other groups containing atoms with unpaired electrons. In general, the activating group is bonded directly to the halogen-containing carbon, although in some cases sufficient activation may result with the presence of a methylene group between the activating group and the halogen-containing carbon. Sufficient activation can occur, for example, with such a methylene group present in the case of ether oxygen activating groups. The above formula is intended to include the presence of such a methylene group so long as sufficient activation of the halogen-containing carbon occurs to result in the halogen atoms being polyamide reactive as described above.

The activating group, X in the above formula, would generally be divalent so that in addition to being bonded to the halogen-containing carbon, this activating group is also bonded to the major polymeric portion of the elastomer.

The R group in the above formula is hydrogen or alkyl (typically lower alkyl having 1 to 6 carbon atoms and preferably methyl) when the major polymeric portion of the elastomer is bonded as just described to the activating group X. However, if X is monovalent, R would represent a divalent radical which bonds the halogen-containing carbon to the major polymeric portion of the elastomer.

The following are examples of groups containing polyamide reactive halogens which may be present in the elastomer employed in the present invention:

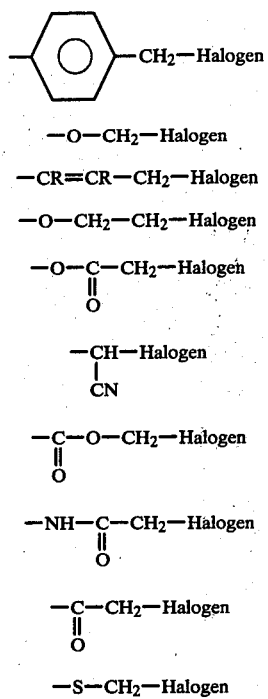

The elastomer should have at least 5 mole equivalents of halogen atoms per $10^6$ grams of polymer and generally up to 500 mole equivalents. Preferred are elastomers having 10–500 mole equivalents of halogen atoms per $10^6$ grams of polymer. Preferred halogens are bromine and chlorine, with chlorine most preferred. The elastomers employed in the present invention are characterized as substantially amorphous polymers having glass transition temperatures below 0° C., preferably below −20° C. By substantially amorphous is meant less than about 10% crystallinity. Methods of determining glass transition temperature would be well known to those skilled in the art, for example, differential scanning calorimetry (DSC).

The major polymeric portion of the elastomer may be derived from any of a wide variety of polymers provided the polymer (a) is substantially amorphous, (b) can be functionalized to contain polyamide reactive halogen atoms, and (c) after such functionalization results in an elastomer characterized as described above. Such polymers include polybutadiene, styrene/butadiene copolymers, acrylonitrile/butadiene copolymers, ethylene/propylene copolymers, polyisoprene, isobutylene/isoprene copolymers, polyacrylates, ethylene/acrylate copolymers, ethylene/propylene/diene terpolymers, ethylene/vinyl acetate copolymers and mixtures thereof.

Halogen functionality may be incorporated into the elastomers by any one of several techniques well known in the art, as, for example, copolymerization of an elastomer monomer, such as ethyl or butyl acrylate, with a halogenfunctional monomer, such as vinyl haloacetate (e.g., $CH_2=CH-O_2C-CH_2Cl$), allyl haloacetate (e.g., $CH_2=CH-CH_2O_2-C-CH_2-Cl$), 2-haloethyl vinyl ether (e.g., $CH_2=CH-O-CH_2-CH_2-Cl$), or vinyl benzyl halide (e.g., $CH_2=CH-C_6H_5-CH_2-Cl$) during synthesis of the elastomer. Alternatively, halogen functionality may be introduced by direct halogenation of a copolymer, for example, the reaction of isobutylene/isoprene copolymer with elemental chlorine or bromine.

Known preferred halogen functional elastomers include polyacrylates and poly(ethylene/acrylates), which are based on alkyl acrylates with 1–15 carbon or oxygen atoms in the alkyl group, and which contain vinyl benzyl chloride units. In addition to ethylene units, the acrylate elastomers may contain minor amounts of other non-acrylic units, such as other vinyl units. Elastomers with little or no unsaturation in the main chain are preferred due to their higher thermal and oxidative stability.

Particularly preferred elastomers are chlorine-functional poly(ethyl/butyl acrylate) and chlorine-functional poly(methoxyethyl/butyl acrylate).

Acrylic elastomers may be synthesized by any radical polymerization process, all well known in the art, including emulsion, suspension, solution, or mass polymerization. Emulsion or suspension polymerization is preferred for all-acrylic elastomers.

Emulsion polymerization is conducted in accordance with known techniques with the use of conventional materials, including, for example, free-radical initiators, soaps and emulsifiers, modifiers of numerous types, and the like.

The polymerization reactions can be initiated by either thermal or redox-type initiator systems. Examples of thermal initiators include the organic peroxides, such as benzoyl peroxide, substituted benzoyl peroxides, acetyl peroxide, lauryl peroxide, t-butyl hydroperoxide, di-t-butylperoxide; peresters, such as t-butyl peroxypivalate; azo-type initiators, such as azo-bisisobutyronitrile; persulfates, such as sodium, potassium, or ammonium persulfate; and peroxyphosphates, such as sodium, potassium, or ammonium peroxyphosphate. Redox initiators include, for example, a combination of a hydroperoxide, such as hydrogen peroxide, t-butyl hydroperoxide, cumene hydroperoxide, diisopropyl benzene hydroperoxide, and the like, and a reducing agent, such as sodium, potassium or ammonium bisulfite, metabisulfite or hydrosulfite, sulfur dioxide, hydrazine, ferrous salts, isoascorbic acid, sodium formaldehyde sulfoxalate, and the like.

Examples of emulsifiers or soaps suited to the polymerization processes include alkali metal and ammonium salts of alkyl, aryl, alkaryl, and aralkyl sulfonates, sulfates and polyether sulfates, fatty acids, ethoxylated fatty acids, esters, alcohols, amines, amides, alkyl phenols, complex organo-phosphoric acids and their alkali metals and ammonium salts.

Chain transfer agents, including mercaptans, polymercaptans, and polyhalogen compounds are often desirable in the polymerization mix.

The polyamide resin compositions of the present invention are prepared by melt-blending 50–97% by weight (70–95% preferred) of the polyamide, with 3–50% by weight (5–30% preferred) of the polyamide reactive halogen functional elastomer. It is to be understood that the polyamide and/or elastomer can be a mixture of more than one polyamide or elastomer, as the case may be. During the melt blending, a coupling reaction takes place between the polyamide and the elastomeric component which is dispersed as a separate soft phase in the polyamide matrix. While the following theory should not be held as delimiting, it is hypothesized that the amine end groups of the polyamide react with the halogen containing groups of the elastomeric component to effect the coupling. The blending and reaction of the two components may be accomplished with a single screw extruder, a twin-screw extruder, or any high-shear commercial grade plastic compounding equipment.

Included in the mix which is melt blended, or in any component of the mix, may be essentially non-reactive, or noninterferring additives, colorants, or reinforcing materials which may be desired to add or enhance existing properties or characteristics. Particularly desirable in impact-resistant type resins may be reinforcing materials, such as glass, metal, mica, silica, clay, and the like. A heat stabilizer such as copper acetate and potassium iodide in combination may be desirable particularly where the products may be exposed to high temperatures. Antioxidants such as organic phosphites and/or hindered phenols may also be desirable. Such stabilizers and antioxidants are well known in the art. An acid acceptor, such as magnesium oxide, may also be desirable to react with HCl generated by the coupling reaction.

To assist those skilled in the art in the practice of this invention, the following modes of operation are set forth as illustrations, parts and percentages being by weight unless otherwise specifically noted.

EXAMPLE 1

2.7 kg of nylon 66 having a relative viscosity of about 50 (measured in formic acid in accordance with ASTM D789) was dry-blended with 0.9 kg of small cubes of a polyacrylate elastomer having polyamide reactive chlorine functionality containing 10 to 25% of ethyl acrylate units, 75 to 90% of butyl acrylate units and 0.23 to 0.33% of chlorine derived from vinyl benzyl chloride comonomer, and having a Mooney viscosity (ML 4 mins. at 212° F.) of 30 nominally. This blend was compounded by extrusion using a 3.81 cm single-screw extruder with barrel and die temperatures of 280° C. The extruder was equipped with a mixing screw and choke valve. The choke valve was closed to maintain maximum back pressure up to 30 MPa. After the first extrusion pass the blend was dried under vacuum for 24 hours at 75° C. and then extruded seven more times. The pelletized blend was then injection molded into 3.175 mm × 12.7 mm × 12.7 cm bars using a commercial reciprocating screw injection molding machine. The bars were kept dry in sealed polyethylene bags and conditioned at room temperature for 24 hours before testing. Notched Izod impact strength was 1035 J/m notch.

A sample of the same unmodified nylon 66 was injection molded and tested in the same manner. Izod impact strength was 59 J/m notch. Izod impact strength was measured in accordance with ASTM D256.

EXAMPLES 2–11

The blends No. 2–11 in Table 1 were prepared using the same nylon 66 and the chlorine functional elastomer described in Example 1. They were compounded and tested as described in Example 1 except as noted.

TABLE 1

| Example | Wt. % Chlorine Functional Elastomer | Total Extrusion Passes | Max. Back Pressure, MPa | Max. Melt Temp., °C. | Izod Impact Strength, J/m |
|---|---|---|---|---|---|
| 2(a) | 20 | 5 | 23 | 282 | 150 |
| 3(a) | 20 | 5 | 22 | 300 | 150 |
| 4(a) | 20 | 8 | 23 | 282 | 144 |
| 5 | 20 | 8 | 30 | 299 | 214 |
| 6 | 20 | 12 | 23 | 298 | 203 |
| 7 | 25 | 4 | 26 | 297 | 368 |
| 8 | 25 | 5 | 28 | 296 | 379 |
| 9(a) | 25 | 8 | 28 | 284 | 246 |
| 10 | 25 | 8 | 27 | 295 | 865 |
| 11 | 25 | 12 | 28 | 298 | 342 |
| 12 | 20 | 8 | 27 | 295 | 288 |
| 13 | 25 | 8 | 26 | 294 | 1100 |

(a)not redried after first pass

EXAMPLES 12 AND 13

Blends No. 12 and 13 in Table 1 were prepared by compounding the chlorine functional elastomer described in Example 1 with a random nylon 66/6 copolymer having 12 weight % nylon 6 and relative viscosity of about 50. Each blend was compounded and tested as described in Example 1 except as noted.

EXAMPLE 14

2.4 kg of the nylon 66 used in Example 1 was dry-blended with 0.6 kg of a polyacrylate elastomer having polyamide reactive chlorine functionality containing 35 to 60% of methoxyethyl acrylate units, 40 to 65% of butyl acrylate units and 0.2 to 0.3% of chlorine derived from vinyl benzyl chloride comonomer, and a Mooney viscosity (ML 4 mins. at 212° F.) of 32 nominally. The blend was compounded, molded and tested as described in Example 1 (4 passes, back pressure=23 MPa, melt temperature −291° C.). Izod impact strength was 189 J/m notch.

EXAMPLE 15

2.4 kg of the nylon 66 used in Example 1 was dry-blended with a polyacrylate elastomer similar to that used in Example 1–13 but containing 1.0 wt. % chlorine from vinyl chloroacetate comonomer. The blend was compounded, molded and tested as described in Example 1 (4 passes, back pressure=17 MPa, melt temperature=288° C.). Izod impact strength was 84 J/m notch.

EXAMPLE 16

A blend was prepared as described in Example 1 from 2.4 Kg of nylon 66 and 0.6 Kg of Chlorobutyl 1066 (Exxon). Chlorobutyl is produced by direct chlorination of an isobutylene/isoprene copolymer. The chlorine groups are largely on reactive allylic carbons. Izod impact strength of the product was 125 J/m.

EXAMPLE 17

Example 16 was repeated, except 4.2 grams of magnesium oxide was added to the blend. Izod impact strength was 156 J/m.

A blend was prepared as described in Example 1 from 2.4 Kg of nylon 66 and 0.6 Kg of Bromobutyl-X2 (Polysar). Bromobutyl is produced by direct bromonation of an isobutylene/isoprene copolymer. Izod impact strength of the product was 87 J/m.

What is claimed is:
1. The product of the process of melt blending:
   (a) from about 50 to about 97% by weight of a polyamide resin derived from (1) the reaction of a dicarboxylic acid or derivative thereof containing from two to twenty carbon atoms with a diamine containing from two to fifteen carbon atoms, or (2) the polymerization of a lactam, and
   (b) from about 3 to about 50% by weight of an elastomer which (1) contains from about 5 to about 500 mole equivalents of polyamide reactive chlorine or bromine atoms per $10^6$ grams of elastomer, said chlorine or bromine atoms being present in the elastomer in segments of the formula:

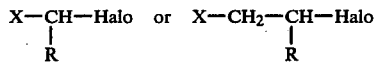

wherein,
X is (i) a monovalent radical selected from the group consisting of phenyl, vinyl, carboxy, cyano and nitro, or (ii) a divalent radical selected from the group consisting of oxy, carbonyl, thio, sulfone and corresponding divalent radicals of said (i) radicals;
R is hydrogen or alkyl when X is an (ii) radical, and a divalent radical when X is an (i) radical; and
Halo is the chlorine or bromine; and
(2) has a glass transition temperature of less than 0° C.

2. The product of claim 1 wherein the polyamide resin is selected from the group consisting of polyhexamethylene adipamide, polyhexamethylene azealamide, polyhexamethylene sebacamide, polycaprolactam, polyhexamethylene isophthalamide, polyhexamethylene tere-co-isophthalamide and mixtures and copolymers of the above.

3. The product of claim 1 or 2 wherein the elastomer is selected from the group consisting of halogen functional poly(ethylene/propylene), polybutadiene, poly(styrene/butadiene), poly(ethylene/propylene/diene), poly(acrylonitrile/butadiene), polyacrylate, poly(ethylene/acrylate), poly(propylene/acrylate), polyisobutylene, polyisoprene, poly(isobutylene/isoprene), poly(ethylene/vinyl acetate) elastomers, and mixtures thereof.

4. The product of claim 1 wherein the amount of polyamide resin blended is 70-95% by weight and the amount of elastomer blended is 5-30% by weight.

5. The product of claim 1 or 2 wherein the polyamide reactive atoms in (b) are chlorine.

6. The product of claim 3 wherein the polyamide reactive atoms in (b) are chlorine.

7. The product of claim 1 wherein the polyamide resin is polyhexamethylene adipamide, and the elastomer is chlorine-functional poly(ethyl/butyl acrylate).

8. The product of claim 1 wherein the polyamide resin is polyhexamethylene adipamide, and the elastomer is chlorine-functional poly(methoxyethyl/butyl acrylate).

9. The process of preparing a high impact-resistant molding or extrusion resin comprising melt blending:
   (a) from about 50 to about 97% by weight of a polyamide resin derived from (1) the reaction of a dicarboxylic acid or derivative thereof containing from two to twenty carbon atoms with a diamine containing from two to fifteen carbon atoms, or (2) the polymerization of a lactam, and
   (b) from about 3 to about 50% by weight of an elastomer which (1) contains from about 5 to about 500 mole equivalents of polyamide reactive chlorine or bromine atoms per $10^6$ grams of elastomer, said chlorine or bromine atoms being present in segments of the formula:

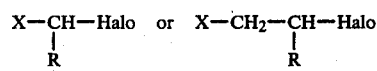

wherein,
X is (i) a monovalent radical selected from the group consisting of phenyl, vinyl, carboxy, cyano and nitro, or (ii) a divalent radical selected from the group consisting of oxy, carbonyl, thio, sulfone and corresponding divalent radicals of said (i) radicals;
R is hydrogen or alkyl when X is an (ii) radical, and a divalent radical when X is an (i) radical; and
Halo is the chlorine or bromine; and
(2) has a glass transition temperature of less than 0° C.

10. The process of claim 9 wherein the polyamide resin is selected from the group consisting of polyhexamethylene adipamide, polyhexamethylene azealamide, polyhexamethylene sebacamide, polycaprolactam, polyhexamethylene isophthalamide, polyhexamethylene tere-co-isophthalamide, and mixtures and copolymers of the above.

11. The process of preparing a high impact-resistant molding or extrusion resin comprising melt blending:
   (a) from about 50 to about 97% by weight of a polyamide resin derived from (1) the reaction of a dicarboxylic acid or derivative thereof containing from two to twenty carbon atoms with a diamine containing from two to fifteen carbon atoms, or (2) the polymerization of a lactam, and
   (b) from about 3 to about 50% by weight of an elastomer which (1) contains from about 5 to about 500 mole equivalents of polyamide reactive chlorine or bromine atoms per $10^6$ grams of elastomer, said chlorine or bromine atoms being present in the elastomer in segments of the formula:

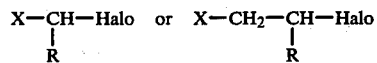

wherein,
X is (i) a monovalent radical selected from the group consisting of phenyl, vinyl, carboxy, cyano and nitro, or (ii) a divalent radical selected from the group consisting of oxy, carbonyl, thio, sulfone and corresponding divalent radicals of said (i) radicals;

R is hydrogen or alkyl when X is an (ii) radical, and a divalent radical when X is an (i) radical; and Halo is the chlorine or bromine; and (2) has a glass transition temperature of less than 0° C.

12. The process of claim 9 wherein the amount of polyamide resin blended is 70–95% by weight and the amount of elastomer blended is 5–30% by weight.

13. The process of claim 11 wherein the polyamide reactive atoms in (b) are chlorine.

14. A composition suitable for melt blending into a high impact-resistant molding or extrusion resin comprising:

(a) from about 50 to about 97% by weight of a polyamide resin derived from (1) the reaction of a dicarboxylic acid or derivative thereof containing from two to twenty carbon atoms with a diamine containing from two to fifteen carbon atoms, or (2) the polymerization of a lactam, and (b) from about 3 to about 50% by weight of an elastomer which (1) contains from about 5 to about 500 mole equivalents of polyamide reactive chlorine or bromine atoms per $10^6$ grams of elastomer, said chlorine or bromine atoms being present in the elastomer in segments of the formula:

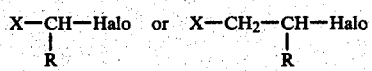

wherein,

X is (i) a monovalent radical selected from the group consisting of phenyl, vinyl, carboxy, cyano and nitro, or (ii) a divalent radical selected from the group consisting of oxy, carbonyl, thio, sulfone and corresponding divalent radicals of said (i) radicals;

R is hydrogen or alkyl when X is an (ii) radical, and a divalent radical when X is an (i) radical; and Halo is the chlorine or bromine; and (2) has a glass transition temperature of less than 0° C.

15. The composition of claim 14 wherein the polyamide resin is selected from the group consisting of polyhexamethylene adipamide, polyhexamethylene azealamide, polyhexamethylene sebacamide, polycaprolactam, polyhexamethylene isophthalamide, polyhexamethylene tere-co-isophthalamide, and mixtures and copolymers of the above.

16. The composition of claim 14 or 15 wherein the elastomer is selected from the group consisting of halogen-functional poly(ethylene/propylene), polybutadiene, poly(styrene/butadiene), poly(ethylene/propylene/diene), poly(acrylonitrile/butadiene), polyacrylate, poly(ethylene/acrylate, poly(propylene/acrylate), polyisobutylene, polyisoprene, poly(isobutylene/isoprene), poly(ethylene/vinyl acetate) elastomers, and mixtures thereof.

17. The composition of claim 14 wherein the amount of polyamide resin is 70–95% by weight and the amount of elastomer is 5–30% by weight.

18. The composition of claim 16 wherein the polyamide reactive atoms in (b) are chlorine.

19. A composition in accordance with claim 1 wherein the polyamide reactive atoms in (b) are present in segments of the formula:

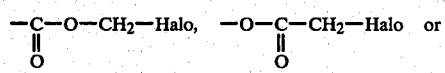

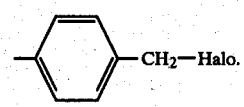

20. A composition in accordance with claim 3 wherein the polyamide reactive atoms in (b) are present in segments of the formula:

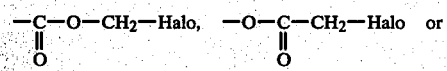

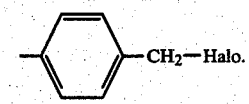

21. A composition in accordance with claim 6 wherein the polyamide reactive atoms in (b) are present in segments of the formula:

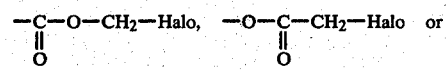

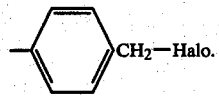

* * * * *